United States Patent

[11] 3,612,209

| [72] | Inventors | John W. Vdoviak;<br>Roy A. Krabacher, both of Cincinnati, Ohio |
|---|---|---|
| [21] | Appl. No. | 880,815 |
| [22] | Filed | Nov. 28, 1969 |
| [45] | Patented | Oct. 12, 1971 |
| [73] | Assignee | General Electric Company |

[54] PROPULSION NOZZLE WITH COMBINED THRUST REVERSER AND SOUND SUPPRESSOR MECHANISM
9 Claims, 6 Drawing Figs.

[52] U.S. Cl. ...................................................... 181/33 HC,
181/33 HD, 60/232, 239/265.13, 239/265.17,
239/265.31
[51] Int. Cl. ...................................................... B64d 33/06,
F01n 1/14
[50] Field of Search........................................... 60/232,
228, 229, 226; 239/265.33, 265.35, 265.37,
265.39, 265.41, 265.13, 265.17, 265.19, 265.25,
265.29, 265.31; 181/33 HC, 33 HB, 33 HD

[56] References Cited
UNITED STATES PATENTS

| 2,931,171 | 4/1960 | Tyler | 239/265.41 X |
| 3,027,714 | 4/1962 | Parker | 239/265.39 X |
| 3,422,624 | 1/1969 | Brooks | 239/265.39 X |
| 3,484,847 | 12/1969 | Poole | 60/229 |
| 3,524,588 | 8/1970 | Duval | 239/265.41 X |

Primary Examiner—Clarence R. Gordon
Attorneys—Derek P. Lawrence, E. S. Lee, III, Lee H. Sachs, Frank L. Neuhauser, Oscar B. Waddell and Joseph B. Forman ABSTRACT: A convergent-divergent nozzle for supersonic propulsion is shown. Flaps are pivotally mounted at the throat of the divergent, secondary nozzle and form a part of the secondary nozzle during normal supersonic propulsion. Spaced flaps, on opposite sides of the nozzle, are pivoted inwardly for sound suppression. All of the flaps are pivoted inwardly to block the hot gas stream and direct it forwardly and laterally through blow-in doors to provide reverse thrust. The flaps are controlled by a unique linkage system.

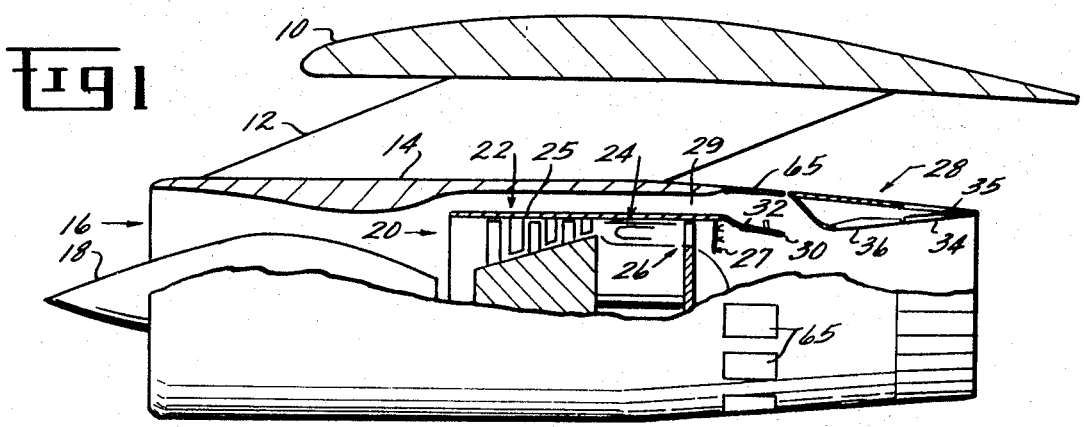
Fig 1
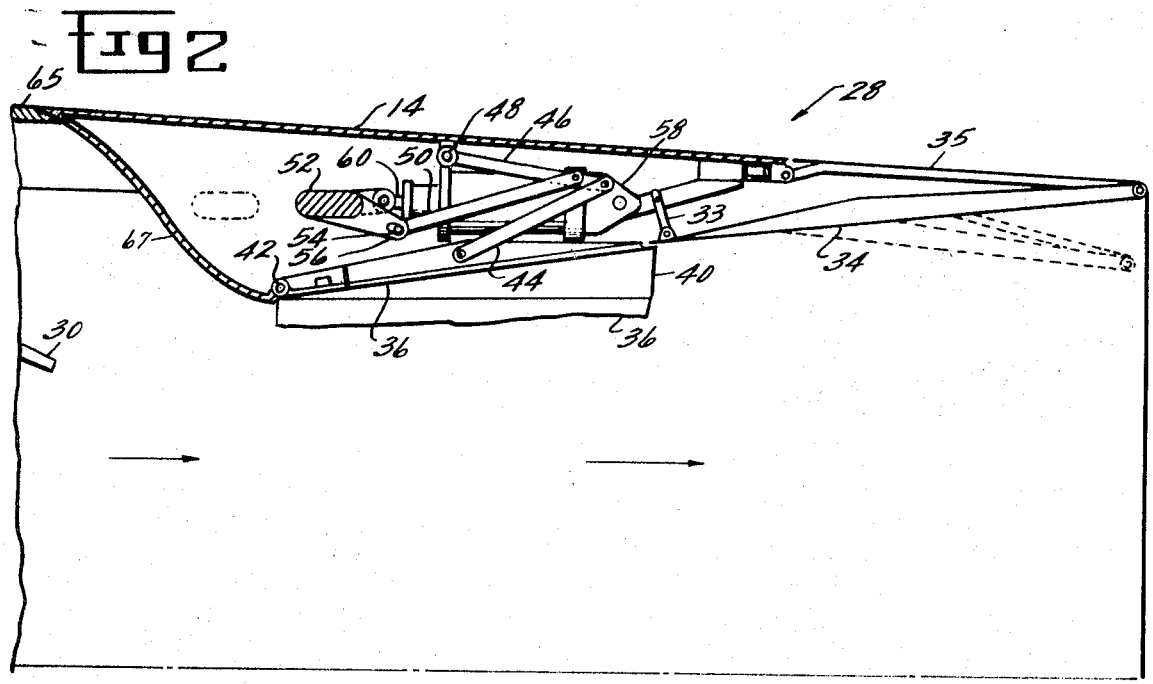
Fig 2
INVENTORS.
JOHN W. VDOVIAK
ROY A. KRABACHER
BY
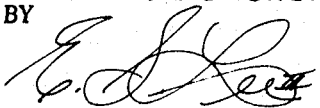
ATTORNEY

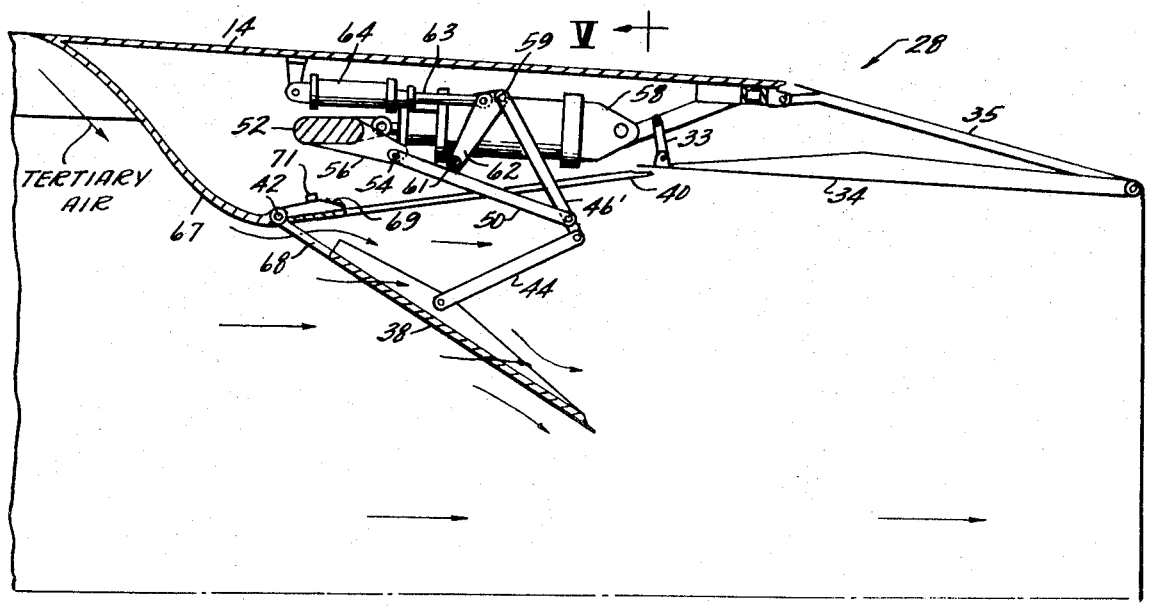
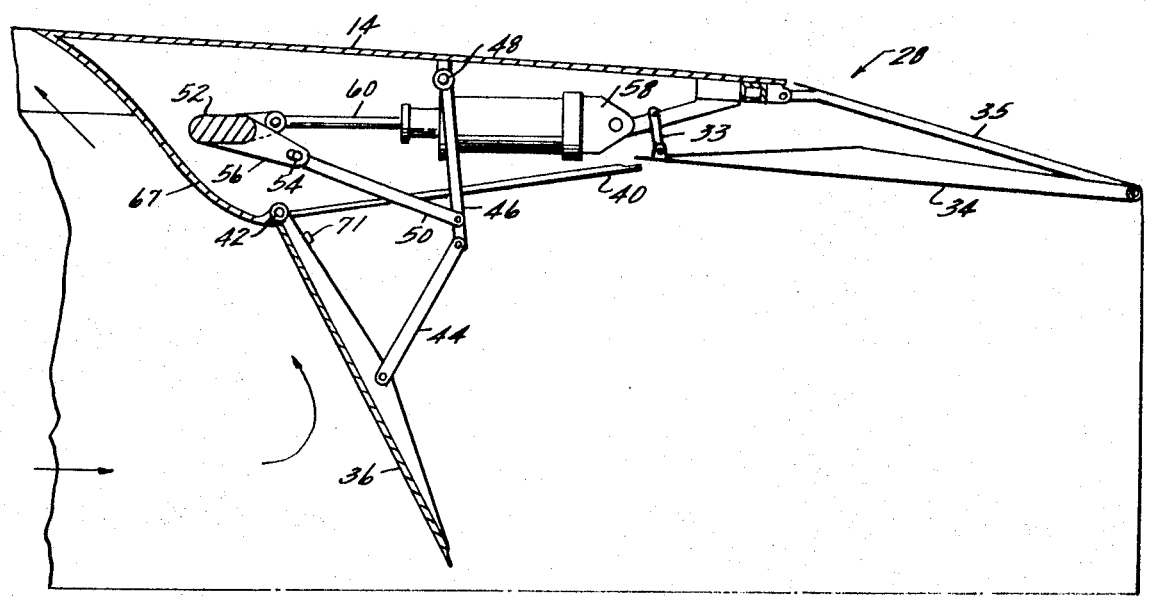

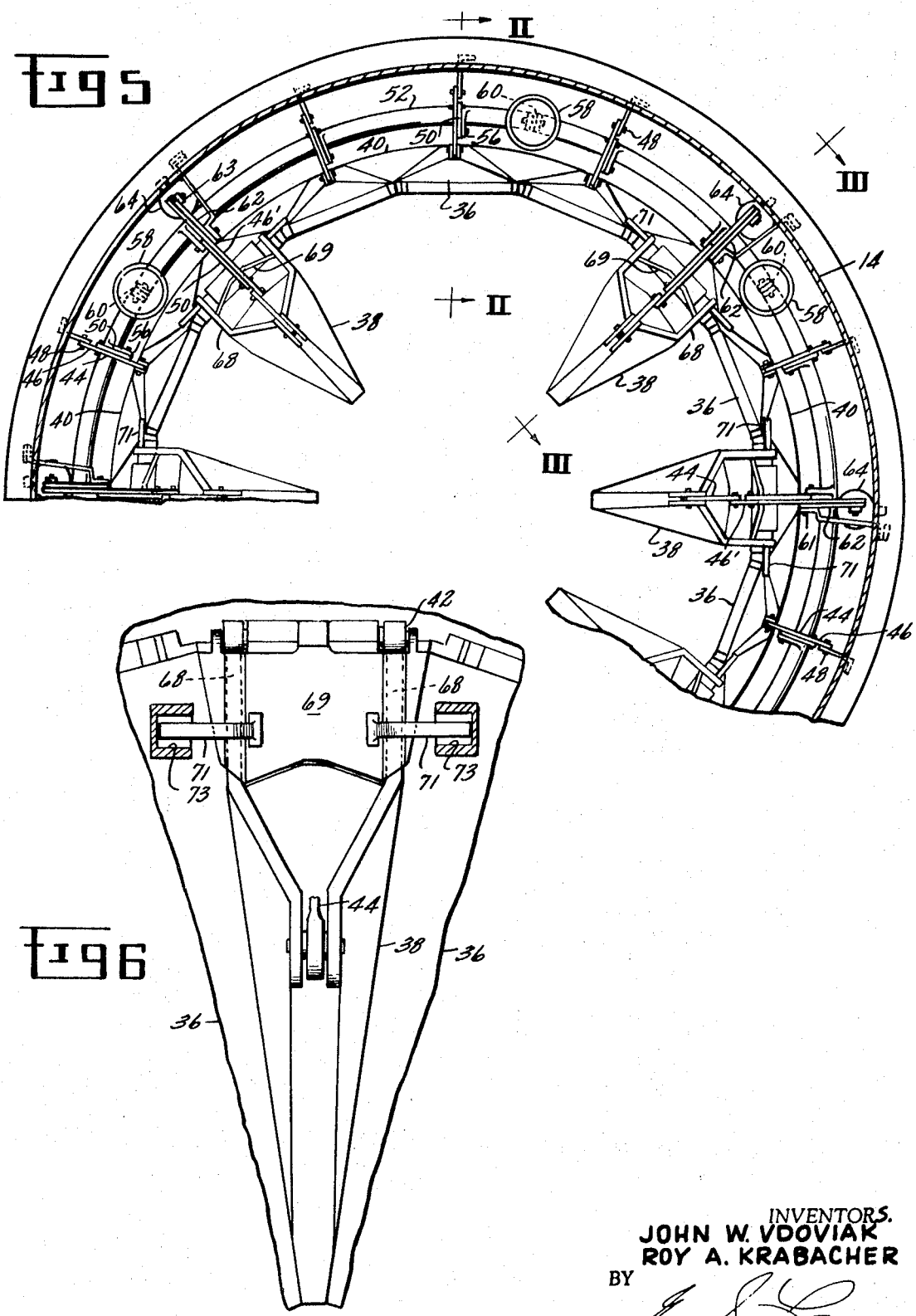

PROPULSION NOZZLE WITH COMBINED THRUST REVERSER AND SOUND SUPPRESSOR MECHANISM

The invention described and claimed in the U.S. patent application herein resulted from work done under U.S. Government contract FA-SS-6 6-6. The U.S. Government has an irrevocable, nonexclusive license under said application to practice and have practiced the invention claimed herein, including the unlimited right to sublicense others to practice and have practiced the claimed invention for any purpose whatsoever.

The present invention relates to improvements in propulsive nozzles of the convergent-divergent type used in supersonic propulsion of aircraft and, more particularly, improved sound suppression and thrust reverse mechanisms therefor.

Commercial aircraft require minimum noise levels when operating at low altitudes, primarily during takeoff, climb and landing. Further, such aircraft must be provided with reverse thrust capabilities and have maneuvering capabilities.

Previous teachings have included the use of flaps or the like that are positioned into a hot gas, propulsive stream in selected fashion to accomplish the thrust reverse and sound suppression functions. It has also been previously proposed that mechanisms be employed, in propulsion nozzles, which may be selectively actuated to provide both of these functions. Such prior proposals have primarily been oriented to simple convergent type nozzles employed in the subsonic propulsion of aircraft.

The object of the present invention is to provide an improved propulsion nozzle of the convergent-divergent type having a combined sound suppression and thrust reversal mechanism which is highly effective, particularly in suppressing noise at the high pressure exhaust nozzle pressure ratios corresponding to high performance, supersonic turbojet engines.

Another object of the invention is to attain the above ends in providing a propulsion nozzle which is particularly suited for use with an afterburning type gas turbine engine wherein additional fuel is burned in the hot gas stream immediately prior to its discharge from the propulsion nozzle.

Another object of the invention is to selectively reduce noise in given directions and, more particularly, to reduce sideband noise. Sideband noise refers to noise levels measured a given distance laterally of an aircraft and is one criterion in the evaluation of aircraft noise levels.

A further object of the invention is to attain the above ends in a manner consistent with aircraft engine propulsion nozzles as regards light weight, reliability and other requisites well known to those skilled in the art.

These ends are obtained by a convergent-divergent nozzle for supersonic propulsion of aircraft wherein the nozzle comprises a primary convergent nozzle and a secondary divergent nozzle axially spaced from the primary nozzle. Means are provided for introducing cool air into the spacing between the primary and secondary nozzles. The secondary nozzle comprises a plurality of flaps extending downstream of its throat. Means are provided for swinging selected, angularly spaced flaps inwardly from said throat to suppress the noise generated by said nozzle and for swinging all of the flaps inwardly to block the hot gas stream and deflect it laterally and forwardly through the spacing between the primary and secondary nozzles for reverser operation. In order to obtain selectivity of sound suppression, the selected flaps are preferably disposed on opposite sides of the nozzle, thus minimizing sideband noise.

Preferably the outer ends of the selected flaps are spaced from the secondary nozzle when swung to their mixing positions to provide a cool air flow path thereover which further increases mixing and suppression. Damper doors may then be swung by other adjacent flaps to block these openings in the reverse thrust position of the flaps.

Swinging movement of the flaps is preferably controlled by a linkage system employing two actuation systems which may be operated independently of each other for rapid deployment of the flaps.

The above and other related objects and features of the invention will be apparent from a reading of the following description of the disclosure found in the attached drawings and the novelty thereof pointed out in the appended claims.

In the drawings:

FIG. 1 is a simplified illustration of a gas turbine engine having a propulsion nozzle embodying the present invention;

FIG. 2 is an enlarged, longitudinal section, taken on line II—II in FIG. 5, of this nozzle showing its supersonic position;

FIG. 3 is a longitudinal section, taken on line III—III in FIG. 5, showing its sound suppressed position;

FIG. 4 is a section similar to FIG. 3, illustrating the reverse thrust position of the nozzle;

FIG. 5 is a partial end view of the nozzle taken on line V—V in FIG. 3; and

FIG. 6 is an end view of flaps deployed for reverse thrust as seen in FIG. 4.

FIG. 1 illustrates the installation of a pod-mounted gas turbine engine employing a propulsion nozzle embodying the present invention. An aircraft wing 10 is shown, in section, with a pylon 12 providing the structural connection to a generally cylindrical pod 14. A typical supersonic inlet 16 is formed at the forward end of the pod by an inlet spike 18. Air flows from the inlet 16 to a gas turbine engine 20, which is illustrated as conventionally comprising a compressor 22 for pressurizing air, a combustor 24 wherein the pressurized air supports combustion of fuel to generate a hot gas stream and a turbine 26 which is driven by the hot gas stream to power the compressor. The hot gas stream is augmented by combustion of fuel in an afterburner 27 and then converted to a propulsive thrust by a nozzle 28 which will be described in greater detail to give an understanding of the present invention.

Before leaving FIG. 1, it will be noted that the outer casing 25 of engine 20 is spaced from the inner surface of the pod 14 to provide a flow path 29 for what is herein referenced as "secondary" air. Thus, a small portion of the air entering the inlet 16 bypasses the engine and enters the propulsion nozzle 28 as secondary air in a manner and for purposes later described.

The nozzle 28, in supersonic flight, assumes a convergent-divergent configuration better illustrated in FIG. 2. The convergent portion of the nozzle, commonly referenced as the primary nozzle, comprises a plurality of flaps 30 which are pivotally mounted on the outer casing of the gas turbine engine. After the hot gas stream is accelerated through the primary portion, it is further expanded in the divergent nozzle portion, commonly referenced as the secondary nozzle. The secondary nozzle comprises a plurality of flaps 34 pivotally connected to boattail flaps 35 at or adjacent to their downstream ends. The boattail flaps are pivotally connected, at their upstream ends, to the pod 14. The upstream ends of the flaps 34 are connected to the pod structure by links 33. The described flaps 34, 35 form an aerodynamically positioned nozzle which automatically adjusts its exit area, in a known fashion, as a function of pressure ratio across the nozzle. The secondary nozzle further comprises reverser flaps 36, suppressor flaps 38 and fixed panels 40 (see also FIG. 5) which compositely form an expansion surface upstream of flaps 34, secondary airflow aerodynamically forms the expansion surface of the nozzle from the downstream ends of the primary flaps 30 to the secondary nozzle. In supersonic operation the flaps 36, 38 are aligned with the fixed panels 40 to form a conical expansion surface.

The reverser flaps 36 are pivotally mounted, by pins 42, on the pod structure. The pins 42 are disposed in a plane generally at the throat of the secondary nozzle. The flaps 36 are connected by respective links 44 to bellcrank levers 46 which are pivotally mounted, at 48, on the structure of the pod 14. Links 50, pivotally attached to he bellcrank levers 46, connect the bellcrank levers to a single actuation ring 52. The links 50 are connected to the ring 52 by pins 54 which are received by lugs 56 projecting from the ring. A plurality of actuators 58 (see also FIG. 5) are mounted on the structure of the pod 14 with their piston rods 60 connected to he actuation ring 52.

The suppressor flaps 38 (FIG. 3) are also pivotally mounted on pins 42 and are similarly connected to the actuation ring 52 by links 44, bellcrank levers 46' and links 50. The bellcrank levers 46' are pivotally connected at 59, to bellcranks 62. The bellcranks 62 are pivotally mounted, at 61, on the structure of the pod. The piston rods 63 of respective actuators 64 are pivotally connected to the bellcranks 62 while the actuators 64 are mounted on the pod structure. In the retracted position of the piston rods 63, the bellcranks maintain the outer pivots 59 for the links 46' in the same relative position as the fixed pivots 48 for the links 46.

To obtain sound suppression, the piston rods 63 are extended (illustrated by the full line showing of FIG. 3) to pivot the bellcranks 62 in a clockwise direction. This causes the described linkage system to rotate about the axes of the pins 54 and swing the suppressor flaps inwardly to a position penetrating at a low angle, the hot gas stream discharged from the primary nozzle.

When the suppressor flaps 38 are so employed tertiary air enters blow-in doors 65 which are spaced around the pod 14 (see also FIG. 1). The tertiary air is guided by a scoop 67 to the throat of the secondary nozzle and then flows over and around the deployed flaps 38 to give effective mixing of cool air with the hot gas stream and thus a large measure of sound suppression. It will be noted that the flaps are spaced from the pivot pins 42 by arms 68 to provide a flow path over their outer edges for the tertiary air. The disposition of the flaps 38, at a low angle into the partially expanded gas stream discharged from the primary nozzle, minimizes the thrust decrement while still providing effective sound suppression.

By deploying three angular spaced flaps on each side of the nozzle (see FIG. 5), selective suppression of sideband noise is achieved within a minimum, overall thrust decrement of the nozzle.

To obtain reverse thrust the piston rods 60 are extended (FIG. 4) to rotate the bellcrank levers 46, 46' in a clockwise direction about their outer pivots and swing all of the flaps 36, 38 inwardly to block the axial hot gas stream flow path. The hot gas stream is then discharged laterally and forwardly through the blow-in doors 65 to provide reverse thrust.

An important feature to note is that the actuation ring can be displaced to provide reverse thrust with the suppressor flaps 38 in their stowed or deployed positions or any intermediate position. When the suppressor flaps 38 are in other than their stowed positions, they will not be fully swung to a blocking position by the ring 52. However, they will provide a substantial amount of blockage and can quickly be brought to a fully closed position by the actuators 64. This permits rapid deceleration in an aborted takeoff when the nozzle would be in its suppressed mode of operation. The flaps 36, 38 can be returned to their stowed positions by retraction of the piston rods 63 to the position illustrated in FIG. 2. Control of pressurized hydraulic or pneumatic fluid to the actuators 58 and 64 can be accomplished in many known ways to achieve the selective positioning described.

In the reverse thrust position of the flaps 36, 38, the spaces between the outer ends of the flaps 38 and the throat of the secondary nozzle is closed off by damper doors 69 (FIG. 6) to provide full blockage of the hot gas stream. The damper doors 69 are mounted on the respective pins 42 for the suppressor flaps 38. Arms 71, projecting from the damper doors 69, are received in sockets 73 on the adjacent reverser flaps 36. The damper doors are thus swung with and by the adjacent reverser flaps to lock the spaces at the outer ends of the suppressor flaps during reverse thrust operation.

While the described deployment of angularly spaced suppressor flaps on the sides of the hot gas stream is preferred to minimize sideband noise, flaps at the top and bottom could also be deployed as suppressor flaps where directivity of suppression is not a factor. This and other modifications of the described embodiments will occur to those skilled in the art within the spirit and scope of the present inventive concepts.

Having thus described the invention, what is claimed as novel and desired to be secured by Letters Patent of the United States is:

1. A convergent-divergent nozzle for supersonic propulsion of aircraft, said nozzle comprising,
   a primary convergent nozzle from which a hot gas stream is discharged,
   a secondary divergent nozzle axially spaced from the primary nozzle,
   means for introducing cool air in the spacing between said primary nozzle and said secondary nozzle at the throat of the latter,
   a plurality of flaps extending downstream of said throat comprising said secondary nozzle, and
   means for swinging selected, angularly spaced flaps inwardly from said throat to mix cool air with partially expanded hot gas stream discharged from the primary nozzle, thus suppressing the noise generated by the nozzle and for swinging all of the flaps inwardly to block the hot gas stream and deflect it laterally and forwardly through the spacing between said primary and secondary nozzles to provide reverse thrust.

2. A nozzle as in claim 1 wherein,
   said selected flaps are on opposite lateral sides of the nozzle.

3. A nozzle as in claim 1 wherein,
   the selected flaps are swung into the hot gas stream at a relatively low angle to mix cool air therewith and the outer ends of the selected flaps are spaced from the secondary nozzle when so disposed to provide a flow path for cool air and thus further increase the mixing action.

4. A nozzle as in claim 3, further comprising,
   damper doors, pivoted by the other flaps adjacent the selected flaps, which are swung by said other flaps to close the spacings between the selected flaps and the secondary nozzle when the hot gas stream is blocked for reverse thrust.

5. A nozzle as in claim 1 wherein,
   the swinging means comprises one actuating means for swinging the selected flaps and another actuating means for swinging the remainder of the flaps and the separate actuating means are both operable independently of each other.

6. A nozzle as in claim 1 wherein,
   the flaps are pivotally mounted at the throat of the secondary nozzle,
   the swinging means comprise a linkage system connected to said selected flaps and bellcranks, and actuator means for pivoting said bellcranks, said linkage means being responsive to pivotal movement of the bellcranks to swing the selected flaps to their mixing positions and
   similar linkage means connected to the other flaps and relatively fixed pivots, an actuator ring and links connecting both linkages to said actuation ring, said linkages being responsive to longitudinal movement of the actuation right to swing all of the flaps to their reverse thrust positions.

7. A nozzle as in claim 6 wherein,
   the selected flaps are swung into the hot gas stream at relatively low angles in their mixing positions and
   the selected flaps include arms extending to the pivotal throat mounting to space the outer ends of said selected flaps from the throat when they are swung to their mixing positions, thus providing a flow path for cool air thereover and an increased mixing action.

8. A nozzle as in claim 7 wherein,
   blow-in doors provide at least a part of the means for introducing cool air and through which the hot gas is discharged when it is blocked by the flaps for reverse thrust.

9. A nozzle as in claim 7 further comprising,
   damper doors respectively pivotally mounted on the same axes as the selected flaps and
   means interconnecting said damper doors and adjacent other flaps for swinging the damper doors therewith, thereby blocking the spacing between the outer ends of the selected flaps and the secondary nozzle throat when the flaps are in their reverse thrust positions.